(12) United States Patent
Wijntjes

(10) Patent No.: US 12,449,519 B2
(45) Date of Patent: Oct. 21, 2025

(54) CLEANING DEVICE, MOTOR VEHICLE AND METHOD

(71) Applicant: MCi (Mirror Controls International) Netherlands B.V., Woerden (NL)

(72) Inventor: Jannick Daniël Wijntjes, Rotterdam (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 18/277,639

(22) PCT Filed: Feb. 22, 2022

(86) PCT No.: PCT/NL2022/050094
§ 371 (c)(1),
(2) Date: Aug. 17, 2023

(87) PCT Pub. No.: WO2022/177437
PCT Pub. Date: Aug. 25, 2022

(65) Prior Publication Data
US 2024/0134023 A1    Apr. 25, 2024
US 2024/0230867 A9    Jul. 11, 2024

(30) Foreign Application Priority Data

Feb. 22, 2021   (NL) ...................... 2027610

(51) Int. Cl.
*B60S 1/48*    (2006.01)
*B60S 1/52*    (2006.01)
*B60S 1/56*    (2006.01)
*G01S 7/481*   (2006.01)
*G01S 7/497*   (2006.01)
(Continued)

(52) U.S. Cl.
CPC ............... *G01S 7/497* (2013.01); *B60S 1/48* (2013.01); *B60S 1/522* (2013.01); *B60S 1/56* (2013.01); *G01S 7/4813* (2013.01); *G01S 17/931* (2020.01); *G02B 27/0006* (2013.01); *G03B 17/08* (2013.01); *G01S 2007/4977* (2013.01)

(58) Field of Classification Search
None
See application file for complete search history.

(56) References Cited

U.S. PATENT DOCUMENTS

2018/0086316 A1   3/2018   Trebouet et al.
2019/0337489 A1   11/2019  Baldovino et al.

FOREIGN PATENT DOCUMENTS

DE    10 2015 118670 A1    5/2017

*Primary Examiner* — Levon J Shahinian
(74) *Attorney, Agent, or Firm* — Volpe Koenig

(57) ABSTRACT

A cleaning device for cleaning an outer surface of an optical instrument of a motor vehicle is provided. The cleaning device comprises a cleaning fluid supply for supplying to the outer surface, and a cover for temporarily covering at least the outer surface. The cleaning device is arranged to move the cover between a covering position and a releasing position in which the cover covers, or leaves uncovered, the outer surface, respectively. Upon moving from the covering position to the releasing position, or vice versa, the cover can be in successive intermediate positions covering a respective first portion and leaving uncovered a respective second portion of said outer surface. The cleaning device is arranged such that in at least one of the positions, the cleaning device defines a flow path between the cover and the outer surface to allow cleaning fluid to flow between them.

20 Claims, 5 Drawing Sheets

(51) Int. Cl.
*G01S 17/931* (2020.01)
*G02B 27/00* (2006.01)
*G03B 17/08* (2021.01)

CLEANING DEVICE, MOTOR VEHICLE AND METHOD

CROSS REFERENCE TO RELATED APPLICATION(S)

This application is a 35 USC § 371 National Stage application of International Application No. PCT/NL2022/050094, filed Feb. 22, 2022, entitled "CLEANING DEVICE, MOTOR VEHICLE AND METHOD", and claims priority to Netherlands Patent Application No. 2027610, filed Feb. 22, 2021, which are incorporated by reference as if fully set forth.

The invention relates to a cleaning device for cleaning an outer surface of an optical instrument of a motor vehicle, in particular one comprising a cleaning fluid supply for supplying cleaning fluid to the outer surface of the optical instrument.

Cleaning devices for cleaning the outer surfaces of optical instruments of motor vehicles are known.

For example, a known cleaning device for cleaning the outer surface of a window pane of a camera mounted on the roof of a car comprising one or multiple nozzles for spraying said outer surface with cleaning fluid.

A disadvantage of a system with such a conventional set-up may lie in that a relatively high pressure may be needed to clean the outer surface by spraying. This may lead to using relatively much cleaning fluid. Alternatively or additionally, it may usually be difficult to reach and clean all areas of the outer surface relatively well, in particular in a manner not involving a complex system.

Additionally or alternatively, another disadvantage of such a conventional set-up may lie in that part of the cleaning fluid may be blown away, for instance due to wind while driving, and will then not reach the outer surface to be cleaned. This may not only lead to a waste of cleaning fluid, due to which one can run out of cleaning fluid relatively quickly and/or due to which a relatively large cleaning fluid reservoir may be necessary for storing a relatively large amount of cleaning fluid to be used, but this may also lead to fluid deposition to the external environment, which may lead to undesirable air pollution and/or water pollution.

It is an object of the invention to provide an alternative cleaning device for cleaning an outer surface of an optical instrument of a motor vehicle. In particular, it can be an object of the invention to provide a cleaning device for cleaning an outer surface of an optical instrument of a motor vehicle comprising a cleaning fluid supply for supplying cleaning fluid to the outer surface of the optical instrument, more in particular one in which at least one of the disadvantages of the prior art cleaning devices is counteracted. Yet more in particular, the invention may aim to provide a cleaning device which may counteract waste of cleaning fluid and/or which may counteract that relatively large amounts of cleaning fluid may get into the environment and/or which may clean the outer surface of the optical instrument in a relatively effective and/or relatively efficient manner.

Thereto, the invention provides for a cleaning device for cleaning an outer surface of an optical instrument of a motor vehicle, wherein the cleaning device comprises a cleaning fluid supply for supplying cleaning fluid to the outer surface of the optical instrument, the cleaning device further comprising a cover for temporarily covering at least the outer surface of the optical instrument, said cover being movable with respect to the outer surface of the optical instrument, wherein the cleaning device is arranged to move the cover between a covering position in which the cover covers the outer surface towards a releasing position in which the cover leaves the outer surface uncovered, wherein the cover, upon moving from the covering position to the releasing position, or vice versa, can be in successive intermediate positions in which the cover covers a respective first portion of the outer surface of the optical instrument and leaves uncovered a respective second portion of said outer surface, and wherein the cleaning device is arranged such that in at least one position out of a group of positions including, preferably consisting of, the covering position and the successive intermediate positions, the cleaning device defines a flow path between at least a part of the cover and at least a part of the outer surface of the optical instrument such as to allow cleaning fluid to flow between said at least a part of the cover and said at least part of the outer surface of the optical instrument.

In particular, the cleaning device can be arranged such that, in said at least one position in which the cleaning device defines said flow path between at least said part of the cover and at least said part of the outer surface of the optical instrument, the cleaning device allows supplied cleaning fluid, in particular cleaning liquid, to flow through said flow path and over said part of the outer surface.

Additionally or alternatively, the cleaning device can be arranged such that in said at least one position in which the cleaning device defines said flow path between at least said part of the cover and at least said part of the outer surface of the optical instrument, preferably wherein the flow path is formed as a small slotted space, the cleaning fluid can be pressed against said outer surface, in particular over a relatively long distance, and can put force on dirt at different locations along the route of the cleaning fluid flowing over said part of the outer surface. As such, it may be facilitated that the cleaning fluid will not only put force on dirt located on a single location in which it first gets into contact with the outer surface as is the case with a conventional camera spraying system, but thus can put force on dirt at different locations along the route of the cleaning fluid flowing over said part of the outer surface.

By arranging the cleaning device such that in at least one position of the group including the covering position and the successive intermediate positions, and preferably in multiple ones of said group of positions, more preferably in each and every one of said positions of said group of positions, the cleaning device defines a flow path between at least a part of the cover and at least a part of the outer surface of the optical instrument, the cleaning device can allow cleaning fluid to flow between said at least a part of the cover and said at least part of the outer surface of the optical instrument in order to rinse the outer surface. In particular, by covering the at least a part of the outer surface of the optical instrument, and letting the cleaning fluid flow therebetween, it can be counteracted that the cleaning fluid may be blown away unintentionally, for instance due to wind, such as wind due to driving.

By supplying cleaning fluid to the outer surface via a flow path, which may be formed as for instance an elongate canal or a split shaped cavity or in any other suitable form, it may be facilitated that relatively much cleaning fluid will actually reach the outer surface to be cleaned, which often will not be the case with a sprayer system, such as for instance a sprayer system typically used to spray windshield washer fluid onto a windshield of a motor vehicle or a sprayer system used to clean a roof mounted camera on a car.

Additionally or alternatively, by supplying cleaning fluid to the outer surface via the flow path, in particular a small slotted space, between the cover and the outer surface to be cleaned, the cleaning fluid can be pressed against said outer surface over a relatively long distance and can put force on dirt at different locations along the route of the cleaning fluid. The cleaning fluid will thus not only put force on dirt located on a single location in which it first gets into contact with the outer surface as is the case with a conventional camera spraying system.

For instance therefore, the present invention may facilitate using relatively little cleaning fluid, whereas it also may facilitate a relatively effective cleaning compared to for instance a conventional camera spraying system.

By providing a pulsed flow, preferably having a relatively high fluctuation rate, the effectiveness and/or the efficiency may be increased even further.

By letting the cover, in particular its rear side which faces the outer surface of the optical instrument when said cover covers said outer surface, define a more or less predefined flow route, and by letting the cleaning fluid, in particular in a pressed manner, flow over at least a part of the outer surface via said more or less predefined flow route, it may be facilitated that the cleaning fluid may be distributed over the outer surface relatively well and/or which may facilitate that the cleaning fluid can execute a relatively high force and/or shear stresses on dirt present on the outer surface.

Additionally or alternatively, a cleaning fluid flow route influencing pattern on the rear side of the cover may influence the flow route in particular such as to differ from a substantially direct route, such as a substantially straight or curved route, over the outer surface.

Preferably, the cleaning fluid flow route influencing pattern may influence the flow of the cleaning fluid in a manner in which the route of said flow can vary over time.

For instance therefore, the cleaning fluid flow route influencing pattern may enable the introduction of a relatively turbulent flow, which may lead to a relatively effective cleaning of at least a part of the outer surface, for example due to that the turbulent flow may enable or increase shear stresses.

For example thereto, the rear surface of the cover may in embodiments be provided with a flow route influencing pattern, which for example may be formed at least partly by means of one or multiple flow interrupting elements, such as for instance studs, ribs, etc.

In embodiments, the cleaning device may be arranged such that a rear surface of the cover faces the outer surface of the optical instrument in at least one of the covering position and the successive intermediate positions, and wherein said rear surface of the cover is provided with a fluid flow route influencing pattern, wherein said rear surface comprises one or multiple flow interrupting elements, such as studs or the like, which may influence the flow route in particular such as to let it differ from a substantially direct route such as a substantially straight or singular curved route over the outer surface.

In preferred embodiments, at least in a position or positions in which the cleaning device defines the flow path between the at least part of the cover and the at least part of the outer surface of the optical instrument, the rear surface of the cover is not in contact with said outer surface of the optical instrument, preferably neither in the covering position nor in the successive intermediate positions.

In embodiments in which the rear surface comprises one or multiple flow interrupting elements, such as studs or the like, said one or multiple flow interrupting elements may preferably be offset from the outer surface of the optical instrument, i.e. not in contact with said outer surface, when the cover is in a position in which the cleaning device defines the flow path between the at least part of the cover and the at least part of the outer surface of the optical instrument.

In embodiments, the flow path, in particular a small slotted space, between the cover and the outer surface to be cleaned may be arranged such that the smallest distance between the rear surface of the cover and the outer surface to be cleaned may be at least 0.5 mm, preferably at least 1 mm, such as for instance at least 2 mm. In case the rear surface of the cover would be provided with one or multiple flow interrupting elements, such as studs or the like, said smallest distance can be located at the location of such a flow interrupting element. In a flow path defining position of the cover, the one or more flow interrupting elements may thus be interspaced from the outer surface of the optical instrument over a distance of at least 0.1 mm, preferably at least 0.2 mm, more preferably at least 0.5 mm, such as for instance at least 1 mm or at least 2 mm.

Additionally or alternatively, the flow path, in particular a small slotted space, between the cover and the outer surface to be cleaned may be arranged such that the smallest distance between the rear surface of the cover and the outer surface to be cleaned may be limited, for instance in order to counteract that too much cleaning fluid, in particular cleaning liquid, can flow below the one or multiple flow interrupting elements, i.e. between said respective flow interrupting element and the outer surface to be cleaned.

For example, when the cover is in a position in which the cleaning device defines the flow path between the at least part of the cover and the at least part of the outer surface of the optical instrument, the smallest distance between the rear surface of the cover and the outer surface to be cleaned may be at most 5 mm, preferably at most 2 mm, such as for instance at most 1 mm or at most 0.5 mm.

Additionally or alternatively, also the largest distance between the rear surface of the cover and the outer surface to be cleaned may be limited, for instance in order to limit the amount of cleaning fluid to be used to fill up the flow path defining space between said rear surface of the cover and said outer surface to be cleaned. For example, the largest distance between the rear surface of the cover and the outer surface to be cleaned may be at most 15 mm, preferably at most 10 mm, such as for instance at most 5 mm, or at most 2 mm. Said largest distance may for instance be located at a position at the rear surface of the cover where it is free from flow path interrupting elements. In particular, in embodiments, said largest distance may be found at a position between two adjacent, interspaced flow path interrupting elements, whereas the smallest distance may be found at a position at which a flow path interrupting element is provided.

Additionally or alternatively, when the cover is in a position in which the cleaning device defines the flow path between the at least part of the cover and the at least part of the outer surface of the optical instrument, the largest distance between the rear surface of the cover and the optical instrument's outer surface to be cleaned may be at most 20%, preferably at most 15%, such as for instance at most 10%, of the length of the optical instrument's outer surface to be cleaned and covered by the cover, wherein said length of the optical instrument's outer surface to be cleaned may be measured along said outer surface, preferably in a substantially straight or singular curved line, and/or in a direction substantially parallel with the direction in which the cover is movable, and/or in a direction substantially parallel with a main direction in which the cleaning fluid substantially flows, which main direction may preferably correspond with a substantially straight line (e.g. in case of a flat outer surface to be cleaned) or singular curved line (e.g. in case of a curved outer surface to be cleaned).

In preferred embodiments, the flow route influencing pattern can be arranged such as to influence the flow of the cleaning fluid in a manner in which it becomes turbulent to at least a certain extent and/or in a manner in which the route of said flow can vary over time.

Alternatively, or additionally, the cleaning fluid flow route influencing pattern may comprise one or multiple flow route defining canals and/or one or multiple other elements, such as ribs or grooves, which for example may guide or direct at least a part of the cleaning fluid to flow in a more or less predefined route, such as for example a more or less meandering route, which does not need to vary over time, but may, in embodiments, be a substantially constant flow route.

The invention also relates to a method for cleaning at least an outer surface of an optical instrument of a motor vehicle, wherein cleaning fluid is supplied into a flow path defined between at least a part of the outer surface and at least a part of a movable cover for temporarily covering at least said outer surface, and wherein supplied cleaning fluid flows through said flow path and over said outer surface.

Advantageous embodiments according to the invention are described in the appended claims.

By way of non-limiting examples only, embodiments of the present invention will now be described with reference to the accompanying figures in which.

It is noted that the figures show merely preferred embodiments of aspects and elements according to the invention. In the figures, the same or similar reference signs or numbers refer to equal or corresponding parts.

FIGS. 1A-2C show an embodiment of a cleaning device 100 according to an aspect of the invention. The cleaning device 100 is arranged for cleaning an outer surface 211 of an optical instrument 200 of a motor vehicle, such as for instance a car or a truck or the like, which for example may be an autonomous or semi-autonomous motor vehicle.

In particular, the optical instrument 200 may be or comprises a camera, for instance a rear-view camera of the motor vehicle, which for instance may be at least for parking assistance. However, the camera may alternatively, or additionally be for other purposes. For example, the camera may be placed at another location than a rear-view camera location typically at the rear of a motor vehicle, and may for example facilitate a front-view and/or may be part of an "omni-view" or so-called "surround-view" technology which may use multiple cameras mounted on the motor vehicle. Just as another example, the camera may be for backing-up or for replacing the function of a wing mirror.

Alternatively or additionally, the optical instrument 200 may be or comprise other elements than a camera. For example, the optical instrument 200 may be or comprise an optical sensor instrument, for instance a Lidar instrument, which for instance may be used for distance measurement and/or for obstacle detection and/or other purposes.

In embodiments, for example when the optical instrument 200 is or comprises a Lidar instrument and/or another sensor device, the outer surface 211 to be cleaned by the cleaning device 100 may for example be an at least partly transparent window pane, for example a window pane covering a sensor part.

Figure 1A:
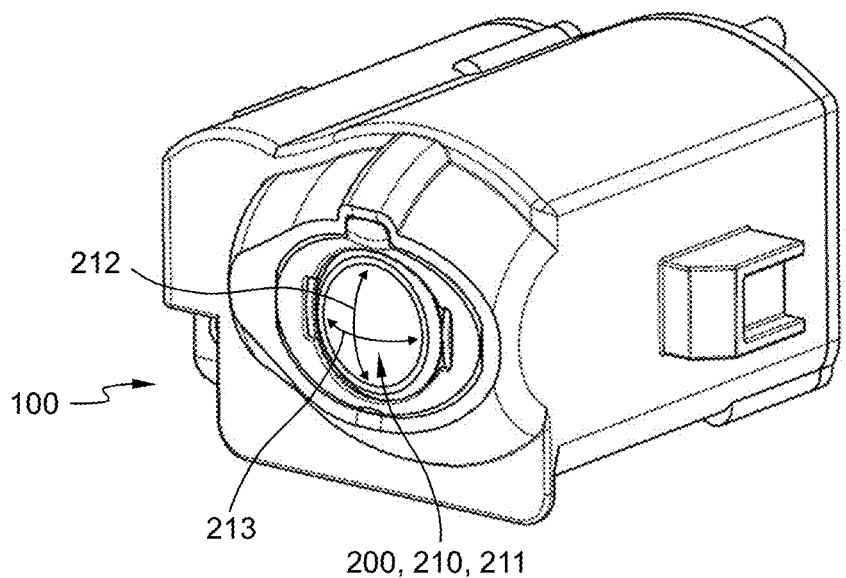
FIGS. 1A-1C show schematic perspective views of an embodiment of a cleaning device according to an aspect of the invention in three different positions.
Figure 1B:
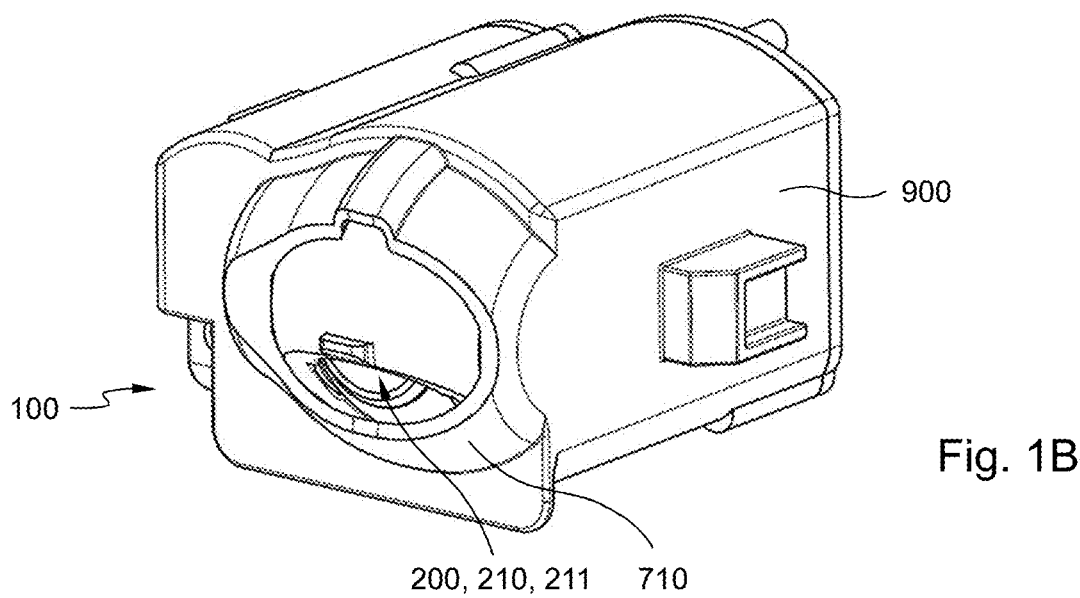
Figure 1C:
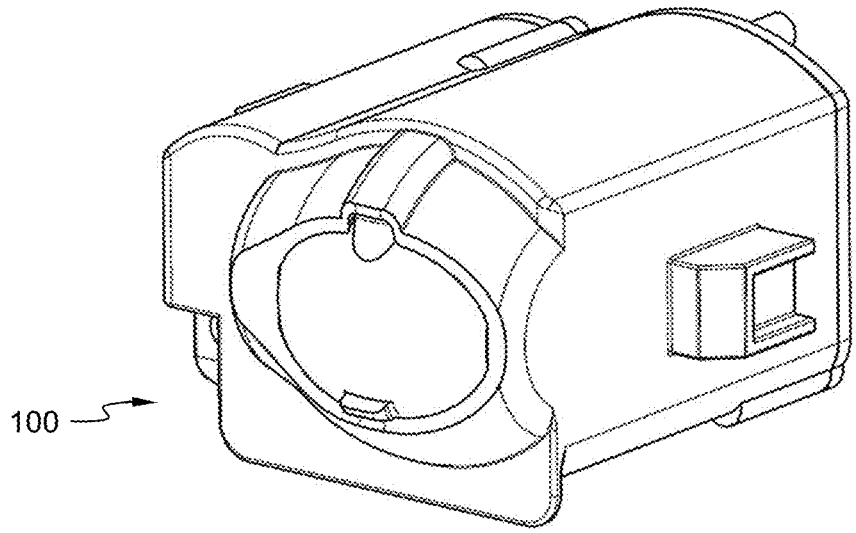
Figure 2A:
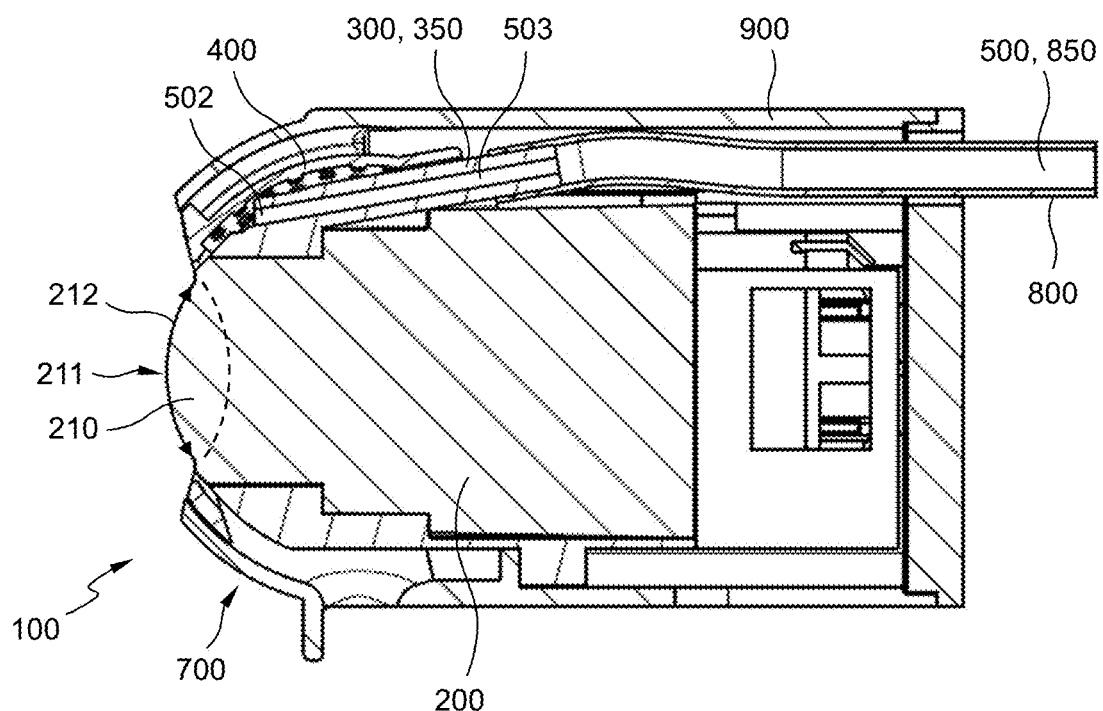
FIGS. 2A-2C show schematic cross-sectional views of the cleaning device of FIGS. 1A-1C in said three positions.
Figure 2B:
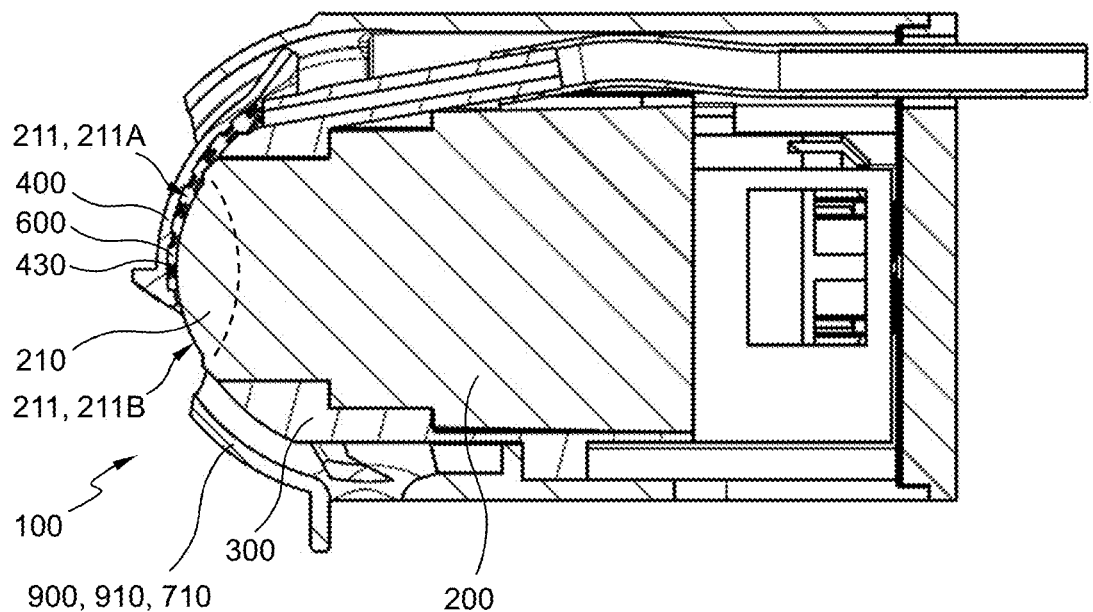
Figure 2C:
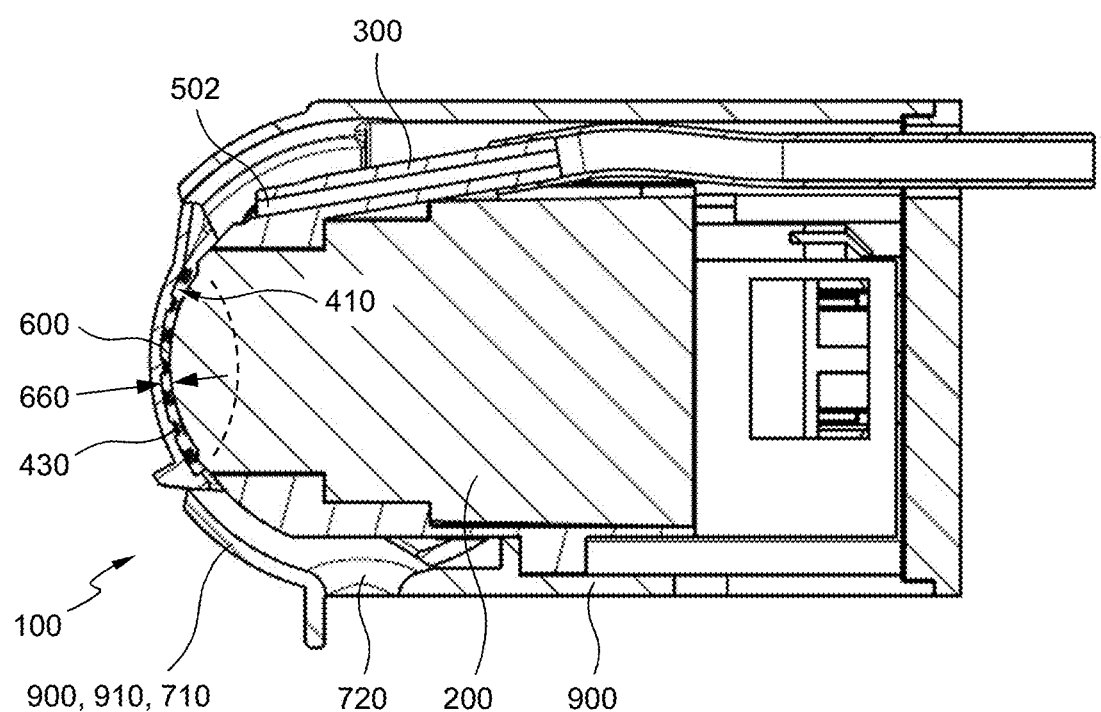

In other embodiments, such as for example the embodiment shown in FIGS. 1A-2C, the outer surface 211 of the optical instrument 200 is formed by a lens 210, which can be seen in FIGS. 2A-2C in which it is schematically drawn by means of a dashed line. The lens 210, an outer surface of which can itself thus form the outer surface 211 of the optical instrument 200, may in particular be a camera lens, for instance for a rear-view camera. Said lens, in particular said camera lens, may be formed by a single optical lens, but may alternatively be formed by an assembly of optical lenses.

In preferred embodiments, the outer surface 211 formed by the lens 210 may be a coated outer surface. In particular, the coated outer surface may be coated by means of a coating being an anti-scratch coating and/or an anti-reflective coating. In particular in such cases, the cleaning device 100 of the present invention may be very advantageous, for example because it may facilitate cleaning such a lens in a relatively harmless but yet relatively effective manner. Additionally or alternatively, the coating may be water repellent and/or hydrophobic. This may counteract that a part of the used cleaning fluid, which preferably may be water based, may unintentionally stay behind on the outer surface 211 after it has been cleaned. In addition or alternatively, for instance even if some cleaning fluid droplets stay behind on the outer surface, the water repellent and/or hydrophobic coating can facilitate that said droplets may be blown away from said surface relatively easily, for instance by wind due to driving and/or by means of a blowing device or blower (not shown), which in embodiments may be included in the cleaning device 100 and/or in the motor vehicle.

It is noted that the optical instrument 200 and the cleaning device 100 for cleaning the outer surface of said optical instrument may in embodiments be formed as two separate devices or instruments. However, as for instance is also the case in the here shown embodiment, the cleaning device 100, or at least parts thereof, may be integrated in the optical instrument 200. As such, at least in embodiments, the present invention can thus also be considered to relate to an optical instrument comprising a cleaning device for cleaning an outer surface of said optical instrument.

Additionally or alternatively, the optical instrument 200 and the cleaning device 100 may be considered to form two elements of an assembly comprising said optical instrument and said cleaning device. For example, one or more parts of one of said two elements may be integrally formed with one or more parts of the other one of said two elements.

As for instance can be seen in the cross sectional views provided by FIGS. 2A-2C, the cleaning device 100 comprising a cleaning fluid supply 500 for supplying cleaning fluid to the outer surface 211 of the optical instrument 200. In the here shown embodiment, a single cleaning fluid supply 500 is provided, but in alternative embodiments, multiple cleaning fluid supplies may be present.

The cleaning fluid supply 500, which may be or comprise at least one cleaning fluid supply canal 503, may be in fluid communication with a cleaning fluid reservoir (not shown), for example via a pump (not shown either). For example, the motor vehicle and/or the cleaning device 100 may be provided with a dedicated fluid reservoir. However, in alternative embodiments, the fluid reservoir and/or cleaning fluid stored therein may also be used for other purposes, for instance for cleaning a windshield, a rear window, one or more headlights and/or one or more other lights and/or one or more other parts of the motor vehicle.

It will be appreciated that the cleaning fluid may be any suitable fluid, for example be or comprise a windshield washer fluid or a similar liquid. In embodiments, the cleaning liquid may be or may at least comprise water. In addition it may comprise other components, such as for example one or more detergents, solvents and/or anti-freeze components, such as an alcohol.

Further, it is noted that the cleaning fluid used for cleaning the outer surface 211 may be heated to a certain extent, in particular in order to increase the cleaning efficiency. For example, one or more of the group consisting of: the cleaning device 100; the cleaning fluid supply 500; and the cleaning fluid reservoir (not shown), may be provided with a heater for heating the cleaning fluid. Alternatively or additionally, a heater for heating the cleaning fluid may be provided at least partly in, on or at the outer surface 211 itself and/or in, on or at the cover 400.

The cleaning device 100 further comprises a cover 400 for temporarily covering at least the outer surface 211 of the optical instrument 200. For example, said cover 400 may at least in embodiments be for shielding the optical instrument 200 at least partly, for example when the optical instrument 200 is not to be used and/or when the motor vehicle is not in use, for instance when it is parked.

The cover 400 is movable with respect to the outer surface 211 of the optical instrument 200, preferably in a substantially downward direction and in a substantially opposite direction. For example, as is the case in the here shown embodiment, the cover 400 may be rotatable or pivotable with respect to said outer surface 211, for instance about a substantially horizontal axis, such that the cover may be pivoted substantially up and down, see FIGS. 1A-1C and FIGS. 2A-2C. For example, the cover 400 may be movably connected, in particular pivotably connected, to a frame part 300. In embodiments, said frame part 300 may be part of the optical instrument 200 and/or may form at least a portion of a housing 320 for said optical instrument 200.

Figure 5:
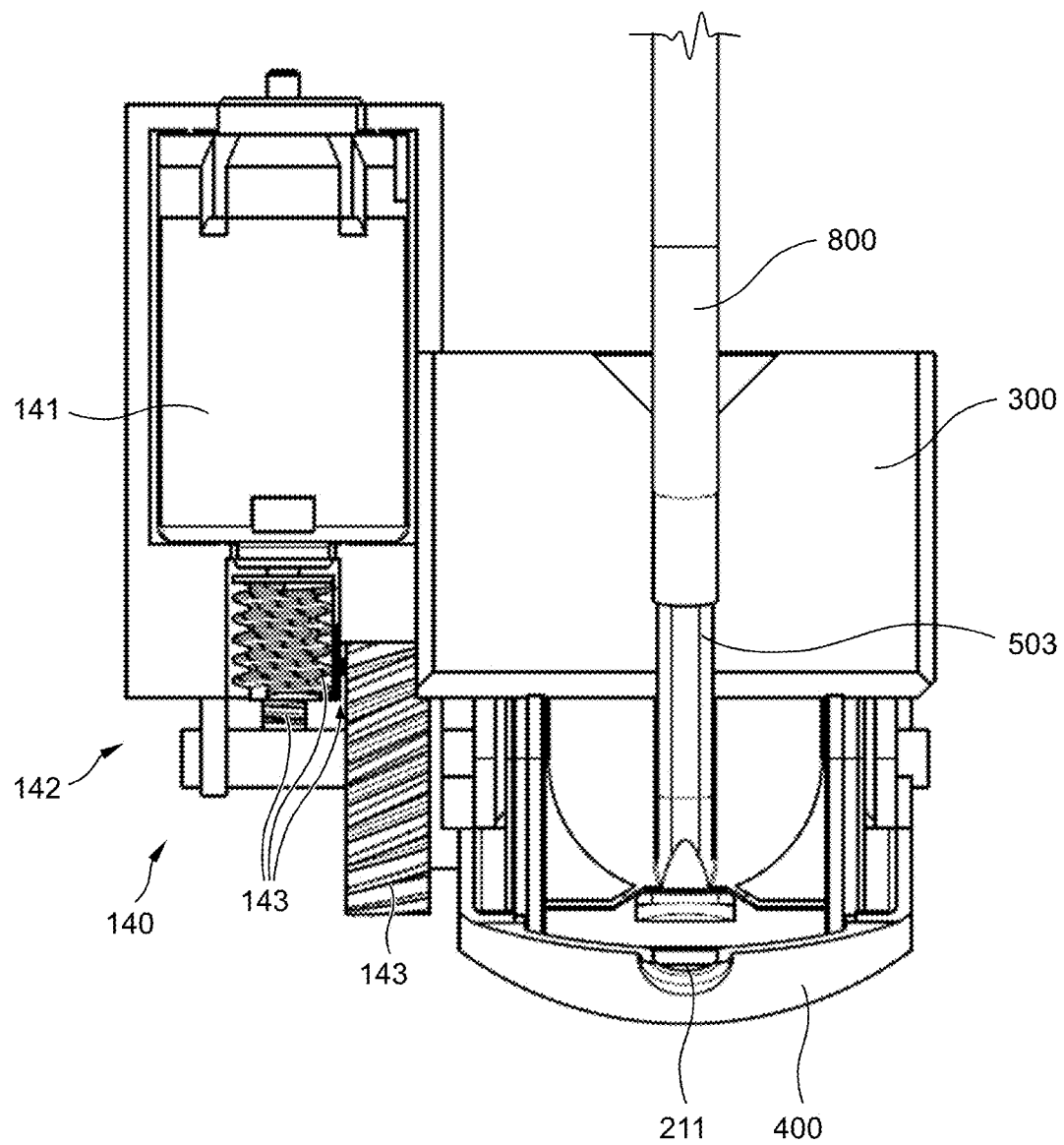
FIG. 5 shows a schematic cutaway top view of the cleaning device of FIGS. 1A-2C in the closed position of FIGS. 1C and 2C.

In embodiments, the cleaning device 100 may comprise a drive 140 for driving the cover 400. The drive 140 may comprise an electric motor 141 or other motor, which may for instance drive the cover 400 directly, or via a drive train 142, which may comprise multiple gears 143, as is the case in the here shown embodiment as can be seen in FIG. 5. The motor 141 and/or other parts of the drive 140, such as the drive train 142 for instance, may in embodiments be held by frame part 300, as can be understood from FIGS. 3 and 5.

Although the drive 140 may be motorized in embodiments, the cover 400 may be moved in alternative manners in alternative embodiments. For example, a pump for supplying the cleaning fluid and/or the fluid pressure of the cleaning fluid may be used to move the cover 140, for instance to move it in a first direction, such as for example a first direction in which the cover moves to a closed position thereof. For moving the cover 140 in a second, opposite direction, for instance in an opening direction, a spring may be used, which spring may be loaded when the cleaning fluid and/or the pump pushes the cover 140 in the first direction. Alternatively, the cleaning fluid and/or the pump may also be used when the cover moves in the second direction.

It will be appreciated that also other mechanisms can be used to move the cover 400, for instance for closing and/or for opening, such as for example pneumatic systems, hydraulic systems and/or mechanisms comprising a solenoid valve, memory shape metals or alloys, etc.

Figure 3:
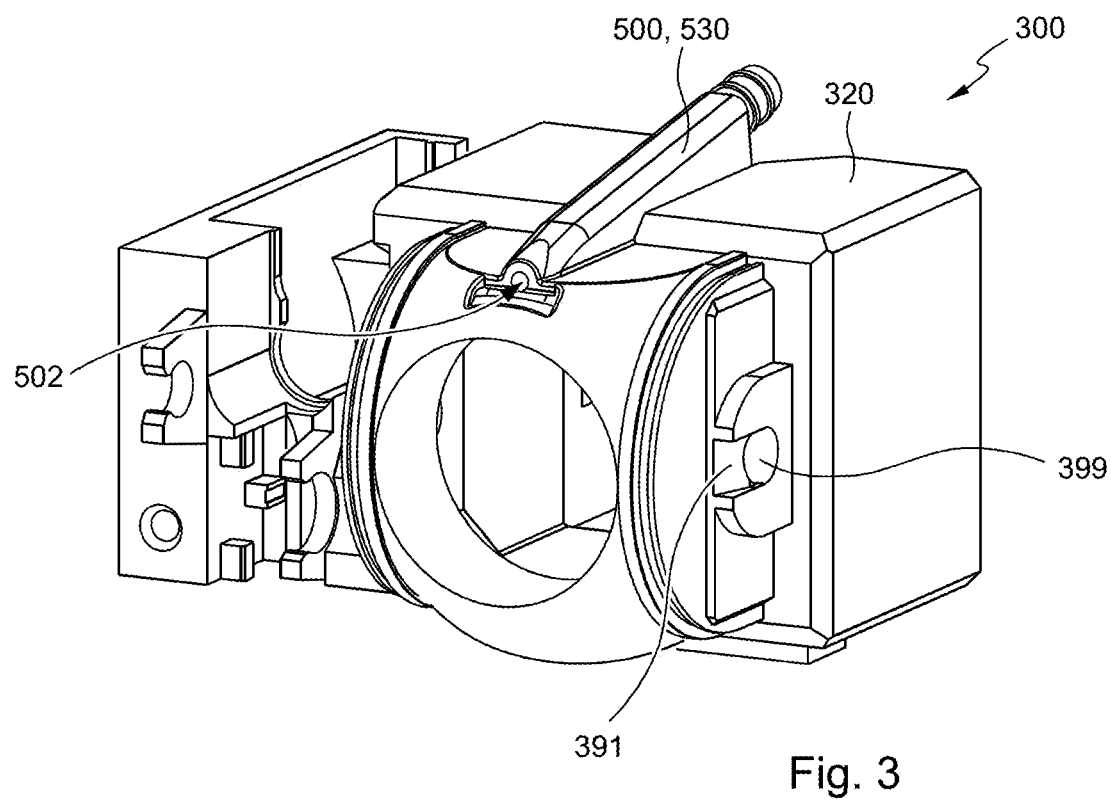
FIG. 3 shows a schematic perspective view of a frame part of the cleaning device of FIGS. 1A-2C.
Figure 4:
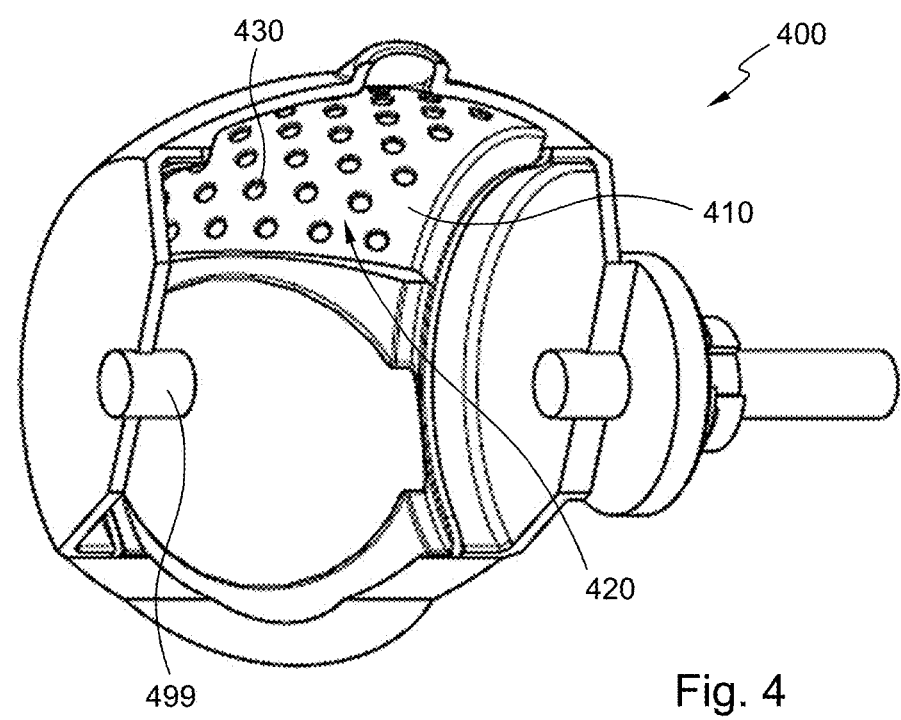
FIG. 4 shows a schematic perspective rear view of a cover part of the cleaning device of FIGS. 1A-2C.

In the here shown embodiment, as can be seen relatively well in FIG. 3 which shows the frame part 300 and FIG. 4 which shows a part forming the cover 400, said frame part 300 and said cover 400 comprise cooperating hinge parts 390, 490 for hingedly mounting the cover 400 to said frame part 300. For example, one of the cover and the frame part, preferably the cover 400, may comprise at least one, preferably two, hinge shafts 490 which may be mounted, preferably clicked or snapped, in one or more corresponding mounting cavities 399 provided in the other one of said cover and said frame part. For example, snapping means, for instance comprising a run-on surface 391, may be provided to facilitate the mounting.

It will be appreciated that the cover 400 may be mounted differently. Actually, it is not necessary that the cover is pivotable with respect to the outer surface 211 of the optical instrument 200. For example, in alternative embodiments, the cover 400 may be slidable in a translatable manner, preferably in a substantially upward direction and a substantially downward direction. However, it is noted that the cover 400 can be movable with respect to the outer surface 211 of the optical instrument 200 in any suitable manner.

In particular, the cleaning device 100 is arranged to move the cover 400 between a covering position, see FIGS. 1C, 2C and 5, in which the cover 400 covers the outer surface 211 towards a releasing position in which the cover 400 does not cover the outer surface 211, but leaves it uncovered, as can be seen in FIGS. 1A and 2A.

Upon moving from the covering position to the releasing position, or vice versa, the cover 400 can be in successive intermediate positions in which the cover 400 covers a respective first portion 211A of the outer surface 211 of the optical instrument 200 and leaves uncovered a respective second portion 211B of said outer surface 211, as can be seen in FIGS. 1B and 2B. It will be appreciated that when the cover 400 moves to its covering position or so-called closed position, the already covered first portion 211A will become larger, whereas the not yet covered second portion 211B will become smaller. On the other hand, when the cover moves towards its releasing position or so-called open position, the size of the first portion 211A will decrease and the second portion 211B will grow larger.

According to the invention, the cleaning device 100 is arranged such that in at least one of the covering position and the successive intermediate positions, and preferably in multiple ones of said positions, more preferably in each and every one of said positions, the cleaning device 100 defines a flow path 600 between at least a part of the cover 400 and at least a part of the outer surface 211 of the optical instrument 200.

As such, the cleaning device 100 can allow cleaning fluid to flow between said at least a part of the cover 400 and said at least part of the outer surface 211 of the optical instrument 200 in order to rinse the outer surface 211.

It will be appreciated that the cleaning device 100 can be arranged to let cleaning fluid flow over at least a portion of the outer surface 211 of the optical instrument 200, in particular in a substantially downward direction. For instance therefore, the cleaning fluid may be supplied at a location at, near and/or above an upper end of the outer surface 211 to be cleaned.

For instance therefore, the cleaning fluid supply 500 may comprise at least one outflow opening 502 located at, near and/or above an upper end of the outer surface 211 to be cleaned by means of the cleaning device 100, preferably at a location above the outer surface 211 of the optical instrument 200, as is the case in the here shown embodiment, and can be seen relatively well in FIGS. 2A-2C and 3.

Although the cleaning device 100 may thus be arranged to let cleaning fluid flow over at least a portion of the outer surface 211 of the optical instrument 200 in a substantially downward direction, in alternative embodiments the cleaning fluid may flow in another direction, such as for instance a substantially sideward direction, a substantially diagonal direction and/or even a substantial upward direction.

It is noted that the flow direction does not need to be constant over said at least portion of the outer surface 211, and that the flow direction may for instance change along its route, for instance in a curved manner and/or in a substantial meandering manner, which for instance may be enabled at least partly by means of one or multiple flow interrupting elements 430, which will be discussed below in more detail, and which during use may prevent a relatively straight or direct flow and may direct or guide the flow, in particular thereby defining at least part of a flow route.

Regarding the cleaning fluid supply 500, which may be or comprise at least one cleaning fluid supply canal 503, it is noted that at least a part 350 of said supply canal 503 may be formed by the frame part 300. However, said supply canal 503, or at least a part 850 thereof, may be formed by means of another element, such as for instance by means of a supply tube 800.

In case of multiple outflow openings, one or multiple ones, and preferably each one, of said multiple outflow opening may be provided above the optical instrument's outer surface 211 to be cleaned by means of the cleaning device 100. However, one or more of the one or multiple outflow openings may be provided at another position, for instance at a lateral side of said outer surface 211.

Advantageously, the cleaning device 100 may be arranged for collecting at least a part of the cleaning fluid supplied into the flow path 600 and flowed over the outer surface 211 of the optical instrument 200. Preferably, the cleaning device 100 may be arranged for collecting said at least part of the cleaning fluid at a location at, near or below a lower end of the outer surface 211 of the optical instrument 200.

In particular, the cleaning device 100 may be provided with a cleaning fluid collection device 700 for receiving and/or collecting used, in particular contaminated, cleaning fluid. Said collection device 700 may for instance comprise a collection surface 710 for collecting fluid, which collection surface may preferably be part of a funnel or funnel shaped part 720. In embodiments, said collection surface 710 and/or said funnel or funnel shaped part 720 may be in fluid connection with a drainage canal, for instance formed by means of a drainage tube (not shown) connected thereto.

In embodiments, the collection surface 710, which may be part of the funnel or funnel shaped part 720, may be formed by a housing part 900, in particular a housing part in which the frame part 300, which may form at least a portion of a housing 320 for the optical instrument 200, can be housed at least partly, as can be seen in FIGS. 1A-1C and 2A-2C. In embodiments, the collection surface 710, which may be formed by the housing part 900, may be formed by a portion 910 of said housing part which doubles as a guide 910 for guiding the movable cover 400 when the cover 400 moves from one of its positions to another.

It will be appreciated that the cover 400, which partly defines the flow path 600 and which can guide cleaning fluid along the outer surface 211 of the optical instrument 200, can thus guide cleaning fluid towards the cleaning fluid collection device 700, for instance towards its collection surface 710 and/or funnel or funnel shaped part 720.

Further, it will be appreciated that the cleaning device 100 may enable storing the collected cleaning fluid, preferably together with dirt and/or debris washed off the outer surface, inside a storage container (not shown), which for example may be provided below the collection surface 710 and/or funnel or funnel shaped part 720, and/or which may be in fluid communication therewith and/or with the drainage tube or other drainage canal.

In embodiments, the outer surface 211 of the optical element 200 can be curved, in particular convex, more in particular substantially formed as a cylindrical surface area or a spherical surface area. However, in alternative embodiments, for example when the outer surface 211 is formed by a Lidar instrument, in particular a protective window pane thereof, the outer surface 211 may be substantially flat, and may then for example extend in an upward direction, such as for instance a substantially vertical direction. For instance in particular in embodiments wherein the outer surface 211 is curved, such as substantially cylindrically or spherically curved, it may be advantageous that the cover 400 may be movable in a rotatable manner.

For instance in such embodiments, a rear surface 410 of the cover 400, which in at least one of the covering position and the successive intermediate positions faces the outer surface 211 of the optical instrument 200, may be substantially concave, and may for instance be curved in a manner corresponding to the outer surface 211 of the optical instrument 200. In particular, the rear surface 410 of the cover 400 may be substantially formed as a spherical surface area, as for instance can be seen in FIG. 4.

In embodiments, in the covering position or so-called closed position, said rear surface 410 of the cover 400 may extend substantially parallel with the outer surface 211 of the optical instrument 200, and may preferably be substantially offset from said outer surface 211.

For example in such embodiments, the flow path 600, seen in a direction substantially transverse to the outer surface 211 to be cleaned, may have a depth 660, and in case of a varying depth it may have a maximum depth 660, which may be relatively small, for instance being smaller than the length or height 212 of the outer surface 212 to be cleaned and/or being smaller than the width 213 of said outer surface 212. In particular, said depth or maximum depth 660 may be at most 50%, preferably at least 25%, more preferably at most 10% of said length or height 212 and/or of said width 213. As a result of the flow path 600 having a relatively low depth, it may be facilitated that relatively little cleaning fluid is to be used. Additional or alternatively, a relatively shallow or superficial flow path 600 may facilitate that cleaning fluid flowing therethrough may flow at a relatively high speed and/or relatively high pressure, which may be beneficial to the cleaning effectiveness.

In advantageous embodiments, the rear surface 410 of the cover 400 can be provided with a cleaning fluid flow route influencing pattern 420. In particular, said rear surface 410 may deviate from a smooth surface, as can be seen for instance in FIG. 4. Said rear surface 410 may for instance comprise one or multiple flow interrupting elements 430. The one or multiple flow interrupting elements 430 may during use prevent a free flow and may as such guide the cleaning liquid and may therefore thus partly define the flow path 600 between at least a part of the cover 400 and at least a part of the outer surface 211 of the optical instrument 200, in particular in a manner in which the cleaning fluid is influenced to flow in a relatively turbulent course. As for instance is the case in the here shown embodiment, the interrupting elements 430 provided at, for instance in or on, the rear surface 410 may for example comprise protrusions such as bulbs or studs 430. However, the flow interrupting elements 430 may alternatively or additionally include one or more differently shaped elements, such as for example ribs or splines.

Although the fluid flow route influencing pattern 420, which may influence the flow route in particular such as to differ from a substantially direct route such as a substantially straight or curved route over the outer surface 211, may preferably cause the cleaning fluid to flow in a relatively turbulent manner, more preferably in a manner in which the flow route may vary over time, the cleaning fluid flow route influencing pattern 420 may, alternatively or additionally, comprise one or multiple flow route defining canals and/or one or multiple other elements, such as grooves or ribs (not shown), which for example may guide or direct at least a part of the cleaning fluid to flow in a more or less predefined route, such as for example a more or less meandering route, which does not need to vary over time, but may, in embodiments, form a substantially constant flow route.

It will be appreciated that the flow path 600, partly defined by the cover 400 and partly defined by the outer surface 211 to be cleaned, may preferably have a width, which in the here shown embodiment—although it is slightly curved—is substantially transverse to the drawing of FIGS. 2A-2C, which width may be at least substantially as wide as the width of the outer surface 211 to be cleaned.

The present disclosure also relates to a method for cleaning at least an outer surface 211 of an optical instrument 200 of a motor vehicle. In said method, which preferably may be executed using an embodiment of a cleaning device as disclosed herein, cleaning fluid is supplied into a flow path 600 defined between at least a part of the outer surface 211 and at least a part of a movable cover 400 for temporarily covering at least said outer surface 211, wherein supplied cleaning fluid flows through said flow path 600 and over said outer surface 211.

Advantageously, when the motor vehicle stands still, for instance when it is parked and/or when the cleaning device 100 is in a park mode, which may correspond with a park mode of the motor vehicle, the cover 400 may cover the outer surface 211 of an optical instrument 200, for instance in order to shield it off from precipitation, dirt, etc. In embodiments, cleaning of the outer surface 211 may take place before the motor vehicle starts driving.

For example, a first step, for instance a soaking step, may be performed by letting a first amount of cleaning fluid flow between the cover 400 and the outer surface 211 when the cover 400 is still in its covering position in which said cover 400 covers the outer surface substantially completely. This step may be performed in order to soak dirt present on said outer surface 211.

In embodiments of the method, it may comprise a second step in which a second amount of cleaning fluid is supplied into the flow path 600. Preferably, said second amount may be supplied during a longer time period and/or at a higher pressure and/or a higher flow rate than the first amount of cleaning fluid was supplied. As a result of the relatively long time period and/or the relatively high flow rate and/or relatively high pressure, dirt or debris may be rinsed away relatively effectively, whereas as a result of the relatively short time period and/or low flow rate and/or relatively low pressure in the first step relatively little cleaning fluid may be used. In this context, it is noted that in order to make the dirt or debris wet or/or in order to soak it, the cleaning fluid can flow over the outer surface 211 for only a relatively short moment, whereas the second step in which the soaked dirt or debris is to be rinsed from said outer surface 211 may take longer, for instance in order to facilitate washing away relatively much dirt or debris.

In embodiments, the second step, which may be a rinsing step, may be executed at least partly when the cover 400 is still closed substantially completely. The second step may additionally or alternatively be executed at least partly when the cover 400 is in an intermediate position in which the cover 400 covers a respective first portion 211A of the outer surface 211 of the optical instrument 200 and leaves uncovered a respective second portion 211B of said outer surface 211. For example, the second step may be executed at least partly while opening the cover 400.

It is noted that in order to let the dirt or debris soak, a first amount of cleaning fluid may thus be provided in the first step. However, the soaking part of the method, or of a cleaning cycle, may also comprise one or more further soaking steps, in which one or more further amounts of cleaning fluid are provided, in particular before the second step is executed. Such one or more further soaking steps may thus form intermediate steps executed in-between the first step and the second step.

It will be appreciated that, additionally or alternatively to the one or more intermediate steps, also one or more additional rinsing steps may be possible within in the method or the cleaning cycle. For example, in one or multiple ones, e.g. in each one, of one or more of such additional rinsing steps, a respective additional amount of cleaning fluid may be supplied. The respective additional amount may for instance correspond with the amount of the second step and/or said respective additional amount may be relatively large with respect to the amount used in the first step and/or in an intermediate step, if any.

Actually, it may be advantageous to move the cover 400, for instance in a direction from a closed position towards an open position, or vice versa, while letting an amount of cleaning fluid flow though the flow path 600 between the cover 400 and the outer surface 211 to be cleaned. In particular, the moving of the cover 400 may cause that that cleaning fluid flows over said outer surface 211 in a relatively turbulent manner. In particular, this may for instance be relatively advantageous when the rear surface 410 of the cover 400 influences the flow route, for example due to a thereon provided fluid flow route influencing pattern 420, as such a flow route may then move relative to the outer surface 211 due to the movement of the cover 400. As such, it may be facilitated that the outer surface 410 can be exposed to cleaning fluid of which the flow route changes during time, which may enable that the outer surface can be rinsed and/or cleaned in a relatively effective manner.

It will be appreciated that when the cover 400 is moving while water is flowing through the flow path 600, said cover 400 may preferably be moved with respect to the outer surface 211 in a direction substantially parallel with said outer surface 211. It will also be appreciated that as a result of the moving of the cover 400, the length, the shape and/or the location of the flow path 600 may thus change while the cleaning fluid is supplied and/or flows through said flow path 600.

It is noted that in addition to the above-mentioned first and second steps, the method, or a single cleaning cycle, may include one or more further steps in which one or more further amounts of cleaning fluid are supplied. For example, the method, or the cleaning cycle, may comprise one or more soaking steps, preferably one soaking step in which one amount of cleaning fluid or one pulse of cleaning fluid is provided, and may further comprise one or more rinsing steps, preferably multiple rinsing steps in which subsequent amounts of cleaning fluid or pulses of cleaning fluid are provided. However, the method, or a cleaning cycle, does not necessarily need to comprise one or more soaking steps, and the method may for instance only include one or more rinsing steps and/or may be free of any preceding dedicated soaking step.

Further, it is noted that the cleaning does not necessary need to be performed at a moment before, while or just after the motor vehicle is been brought into a drive mode or state, but may for instance alternatively or additionally be performed when the motor vehicle is in use and/or is in a drive mode. For example, during driving of the motor vehicle, the outer surface 211 may be cleaned. Although the outer surface 211 may in embodiments be closed for a relatively long time during driving the motor vehicle, in other embodiments the outer surface 211 may be left uncovered for a relatively long time, or even for most of the time, during driving. When the outer surface 211 is cleaned during driving, the outer surface 211 may thus initially be uncovered by the cover 400.

For example in order to keep the time that the outer surface 211 is covered and/or the view of the optical instrument 200 is blocked relatively short, the cleaning fluid may be supplied over the outer surface during the closing of the cover 400 and/or during the subsequent opening of the cover 400.

For instance in view of that it may be advantageous to let the cleaning fluid flow over the cover 400 while moving the cover 400 with regard to the outer surface 211, in particular to facilitate a relatively turbulent flow, the cover 400 may close and open multiple times during the cleaning of the outer surface 211, for example by moving the cover up and down multiple times or by any other suitable movement, for instance when the cleaning device 100 is embodied in a different manner than in the here shown embodiment.

Further, it is noted that surprisingly it has been found that even when the cover 400 is not completely covering the outer surface 211, and is for instance covering only at least half, at least a third or even only at least a quarter of said outer surface 211, most of the cleaning fluid supplied between the cover 400 and the outer surface 211 flowing over covered first portion 211A of the outer surface 211 may continue following the outer surface 211 and flow over the second portion 211B of said outer surface 211 when it flows from beneath the cover 400 at the edge, in particular the lower edge of the cover 400 which is then not completely covering the outer surface 211. This seems to be in particular the case when the outer surface is relatively smooth, for instance substantially curved, in particular substantially convex, such as for example substantially spherical, and/or when the outer surface 211 descends in a substantially downward direction. Surprisingly, the outer surface 211 to be cleaned does thus not need to be covered entirely by the cover 400 in order to direct the cleaning fluid along said outer surface 211, in particular a convexly curved outer surface and/or towards an optional collection device 700 for collecting used cleaning fluid.

It is noted that the cleaning fluid used for cleaning the outer surface may be supplied in different supplies, which means that in an alternating manner cleaning liquid may be supplied and subsequently no cleaning liquid is supplied and then again a further supply of cleaning liquid is supplied.

The cleaning fluid can thus be supplied in a pulsed manner, for example with alternating pulses of cleaning liquid. Alternatively or additionally, the flow rate and/or the pressure may be fluctuated while supplying the cleaning fluid into the flow path 600. This may also enable that cleaning fluid can be supplied into the flow path in a pulsed manner.

By alternatingly supplying the cleaning fluid and/or by fluctuating the flow rate and/or the pressure and/or the direction of the flow route, for instance by moving the cover 400, the outer surface 211 may be cleaned in a relatively efficient manner, for example due to a relatively turbulent and/or fluctuating flow.

Further, additionally or alternatively, the method may provide for collecting at least a part of the cleaning fluid supplied into the flow path 600 and flowed over the outer surface 211 of the optical instrument 200, for example such as to enable storing the collected cleaning fluid, preferably together with dirt washed off the outer surface, inside a storage container. This may for example counteract that the used cleaning fluid may get into the environment, and may as such counteract air pollution and/or water pollution. Preferably, the collection may be done at, near or below a lower end of said outer surface 211, for instance such as to facilitate that cleaning fluid can flow in a substantially downward direction during the cleaning.

Regarding the method for cleaning at least an outer surface 211 of an optical instrument 200 of a motor vehicle, it is noted that said method, which may, at least in embodiments, be considered to correspond with a cleaning cycle, in particular a single cleaning cycle, may be performed or executed at any suitable moment. For example, the cleaning device 100, the motor vehicle and/or the optical instrument 200 may be arranged to start or to perform the method, for instance automatically, at a certain moment, for instance when the motor vehicle and/or the optical instrument 200 is or will be shut off and/or when input is received to shut it off, such as for example when the motor vehicle is parked. Alternatively or additionally, the cleaning device 100, the motor vehicle and/or the optical instrument 200 may be arranged to start or to perform the method when the motor vehicle and/or the optical instrument 200 is started or has received input such as to be started. However, the method or cleaning cycle may alternatively or additionally also be started or performed for other reasons and/or at other moments. For example, the method or cleaning step may be performed or started in response to input generated when the motor vehicle and/or its optical instrument 200 detects that a cleaning cycle is desirable, for instance by detecting debris or dirt on the outer surface 211, for instance by means of software belonging or relating to the optical instrument 200. Just as another example, the cleaning cycle or cleaning method may be started or performed based on other input, for instance human input, which for example may be given by a driver of the motor vehicle.

It will be appreciated that the cover 400 used for cleaning or so-called washing of the outer surface 211 of the optical instrument 200 may have multiple purposes, and that said cover 400 may for example also be used for shielding or covering said outer surface 211 temporarily, for example when the optical instrument 200 is not in use, for example when the motor vehicle is parked.

It is noted that for the purpose of clarity and a concise description features are described herein as part of the same or separate embodiments, however, it will be appreciated that the scope of the invention may include embodiments having combinations of all or some of the features described.

Further, it is noted that the invention is not restricted to the embodiments described herein. It will be understood that many variants are possible. Such variants will be apparent for the person skilled in the art and are considered to lie within the scope of the invention as formulated in the following claims.

The invention claimed is:

1. A cleaning device for cleaning an outer surface of an optical instrument of a motor vehicle,
the cleaning device comprising a cleaning fluid supply for supplying a cleaning fluid to the outer surface of the optical instrument,
the cleaning device further comprising a cover for temporarily covering at least the outer surface of the optical instrument, said cover being movable with respect to the outer surface of the optical instrument, wherein the cleaning device is arranged to move the cover between a covering position in which the cover covers the outer surface towards a releasing position in which the cover leaves uncovered the outer surface,
wherein the cover, upon moving from the covering position to the releasing position, or vice versa, can be in successive intermediate positions in which the cover covers a respective first portion of the outer surface of the optical instrument and leaves uncovered a respective second portion of said outer surface,
wherein the cleaning device is arranged such that in at least one position of a group of positions including the covering position and the successive intermediate positions, the cleaning device defines a flow path between at least a part of the cover and at least a part of the outer surface of the optical instrument such as to allow the cleaning fluid to flow between said at least a part of the cover and said at least part of the outer surface of the optical instrument,
wherein a rear surface of the cover faces the outer surface of the optical instrument in at least one of the covering position and the successive intermediate positions, and wherein said rear surface of the cover is provided with a fluid flow route influencing pattern.

2. The cleaning device according to claim 1, wherein the cleaning device is arranged to let the cleaning fluid flow over at least a portion of the outer surface of the optical instrument, for example in a substantially downward direction.

3. The cleaning device according to claim 1, wherein the cleaning fluid supply comprises at least one outflow opening located above the outer surface of the optical instrument.

4. The cleaning device according to claim 1, wherein the optical instrument is or comprises a camera.

5. The cleaning device according to claim 1, wherein the outer surface of the optical instrument is formed by a lens.

6. The cleaning device according to claim 5, wherein the outer surface formed by the lens is a coated outer surface.

7. The cleaning device according to claim 1, wherein the cleaning device is arranged for collecting at least a part of the cleaning fluid supplied into the flow path and flowed over the outer surface of the optical instrument.

8. The cleaning device according to claim 1, wherein the outer surface of the optical element is curved.

9. The cleaning device according to claim 8, wherein the rear surface of the cover faces the outer surface of the optical instrument in at least one of the covering position and the successive intermediate positions, and wherein said rear surface of the cover is substantially curved.

10. The cleaning device according to claim 1, wherein the optical instrument is or comprises a Lidar instrument.

11. The cleaning device according to claim 1, wherein said rear surface deviates from a smooth surface, and wherein said rear surface comprises one or multiple flow interrupting elements which influence the flow route.

12. The cleaning device according to claim 11, wherein the one or more flow interrupting elements influence the flow route to let the flow route differ from a substantially direct route over the outer surface, in order to influence the flow of the cleaning fluid in a manner in which the flow becomes turbulent to at least a certain extent and/or in a manner in which the flow route can vary over time, wherein the substantially direct route is a substantially straight route or a curved route.

13. The cleaning device according to any claim 1, wherein the cleaning device is arranged such that in at least one of the covering position and the successive intermediate positions, at least the part of the rear surface covering the respective part of the outer surface of the optical instrument is extending substantially parallel with said part of the outer surface.

14. A motor vehicle provided with an optical instrument, wherein the motor vehicle further comprises the cleaning device according to claim 1 for cleaning the outer surface of said optical instrument, for instance wherein the cleaning device and the optical instrument are at least partly integrated with each other.

15. A method for cleaning at least an outer surface of an optical instrument of a motor vehicle using a cleaning device, the method comprising:
supplying a cleaning fluid into a flow path defined between at least a part of the outer surface of the optical instrument and at least a part of a cover of the cleaning device,
wherein the cleaning fluid that is supplied flows through said flow path and over said outer surface, and
wherein the cleaning device comprises:
a cleaning fluid supply for the supplying of the cleaning fluid to the outer surface of the optical instrument, and
the cover, wherein the cover is for temporarily covering at least the outer surface of the optical instrument, said cover being movable with respect to the outer surface of the optical instrument, wherein the cleaning device is arranged to move the cover between a covering position in which the cover covers the outer surface towards a releasing position in which the cover leaves uncovered the outer surface,
wherein the cover, upon moving from the covering position to the releasing position, or vice versa, can be in successive intermediate positions in which the cover covers a respective first portion of the outer surface of the optical instrument and leaves uncovered a respective second portion of said outer surface,
wherein the cleaning device is arranged such that in at least one position of a group of positions including the covering position and the successive intermediate positions, the cleaning device defines the flow path between at least a part of the cover and at least a part of the outer surface of the optical instrument such as to allow the cleaning fluid to flow between said at least a part of the cover and said at least part of the outer surface of the optical instrument,
wherein a rear surface of the cover faces the outer surface of the optical instrument in at least one of the covering position and the successive intermediate positions, and wherein said rear surface of the cover is provided with a fluid flow route influencing pattern.

16. The method according to claim 15, wherein the cover is moved with respect to the outer surface, while the cleaning fluid is supplied into the flow path and/or while the cleaning fluid flows through said flow path.

17. The method according to claim 15, wherein the cleaning fluid is supplied into the flow path in a pulsed manner.

18. The method according to claim 15, further comprising supplying a first amount of cleaning fluid.

19. The method according to claim 18, further comprising supplying a second amount of cleaning fluid into the flow path.

20. The method according to claim 15, wherein at least a part of the cleaning fluid supplied into the flow path and flowed over the outer surface of the optical instrument is collected.

\* \* \* \* \*